US011574252B2

(12) United States Patent
Calvano

(10) Patent No.: US 11,574,252 B2
(45) Date of Patent: Feb. 7, 2023

(54) SYSTEM AND METHOD FOR PRIORITIZING AND RANKING STATIC ANALYSIS RESULTS USING MACHINE LEARNING

(71) Applicant: Raytheon Company, Waltham, MA (US)

(72) Inventor: Andrew R. Calvano, Draper, UT (US)

(73) Assignee: Raytheon Company, Waltham, MA (US)

( * ) Notice: Subject to any disclaimer, the term of this patent is extended or adjusted under 35 U.S.C. 154(b) by 410 days.

(21) Appl. No.: 16/795,439

(22) Filed: Feb. 19, 2020

(65) Prior Publication Data

US 2021/0256426 A1    Aug. 19, 2021

(51) Int. Cl.
*G06F 9/44* (2018.01)
*G06N 20/10* (2019.01)
*G06F 17/18* (2006.01)
*G06K 9/62* (2022.01)

(52) U.S. Cl.
CPC ............ *G06N 20/10* (2019.01); *G06F 17/18* (2013.01); *G06K 9/6256* (2013.01)

(58) Field of Classification Search
CPC .................................................... G06N 20/10
USPC ........................................................ 706/12
See application file for complete search history.

(56) References Cited

U.S. PATENT DOCUMENTS

| 11,074,055 B2* | 7/2021 | Byrne ................... G06F 21/577 |
| 2017/0154181 A1* | 6/2017 | Venkataramani ..... G06F 21/566 |

OTHER PUBLICATIONS

Bottinger et al., "Deep Reinforcement Fuzzing," https://arxiv.org/pdf/1801.04589.pdf, Jan. 2018, 7 pages.
Chen et al., "EnFuzz: Ensemble Fuzzing with Seed Synchronization among Diverse Fuzzers," https://arxiv.org/pdf/1807.00182.pdf, May 2019, 17 pages.
International Search Report and Written Opinion of the International Searching Authority in connection with International Patent Application No. PCT/US2020/070952 dated Apr. 9, 2021, 10 pages.
Kronjee et al., "Discovering software vulnerabilities using data-flow analysis and machine learning," Proceedings of the 13th International Conference on Availability, Reliability and Security, Article No. 6, Aug. 2018, 10 pages.
Guanhua et al., "ExploitMeter: Combining Fuzzing with Machine Learning for Automated Evaluation of Software Exploitability," 2017 IEEE Symposium on Privacy-Aware Computing, Aug. 2017, 12 pages.

* cited by examiner

*Primary Examiner* — Timothy A Mudrick

(57) ABSTRACT

A method includes obtaining at least one program slice embedding vector and at least one register vector that are generated based on results from a static analysis tool, the at least one register vector corresponding to the at least one program slice embedding vector. The method also includes using a machine learning model to generate, from the at least one program slice embedding vector and the at least one register vector, at least one probability rating associated with a vulnerability. The method also includes reporting the at least one probability rating for use by the static analysis tool.

20 Claims, 6 Drawing Sheets

SYSTEM AND METHOD FOR PRIORITIZING AND RANKING STATIC ANALYSIS RESULTS USING MACHINE LEARNING

TECHNICAL FIELD

This disclosure is generally directed to machine learning systems. More specifically, this disclosure is directed to a system and method for prioritizing and ranking static analysis results using machine learning.

BACKGROUND

Static analysis is a method of computer program debugging that is performed by examining the code without actually executing the program. In many cases, static analysis is performed on the program's source code. In some cases, static analysis is performed on object code. Automated tools exist that can assist programmers and developers in carrying out static analysis, such as static analysis based source code and binary vulnerability detection tools. However, such tools are prone to producing many false positives, due to over-approximating the possibilities of program paths that may execute during a program execution. This results in many alerts that a human analyst (or downstream automation tool) must sift through in order to identify the true positives.

SUMMARY

This disclosure relates to a system and method for prioritizing and ranking static analysis results using machine learning.

In a first embodiment, a method includes obtaining at least one program slice embedding vector and at least one register vector that are generated based on results from a static analysis tool, the at least one register vector corresponding to the at least one program slice embedding vector. The method also includes using a machine learning model to generate, from the at least one program slice embedding vector and the at least one register vector, at least one probability rating associated with a vulnerability. The method also includes reporting the at least one probability rating for use by the static analysis tool.

In a second embodiment, a system includes at least one memory configured to store instructions and at least one processor coupled to the at least one memory. The at least one processor is configured when executing the instructions to obtain at least one program slice embedding vector and at least one register vector that are generated based on results from a static analysis tool, the at least one register vector corresponding to the at least one program slice embedding vector; use a machine learning model to generate, from the at least one program slice embedding vector and the at least one register vector, at least one probability rating associated with a vulnerability; and report the at least one probability rating for use by the static analysis tool.

In a third embodiment, a non-transitory computer readable medium contains instructions that when executed cause at least one processor to obtain at least one program slice embedding vector and at least one register vector that are generated based on results from a static analysis tool, the at least one register vector corresponding to the at least one program slice embedding vector; use a machine learning model to generate, from the at least one program slice embedding vector and the at least one register vector, at least one probability rating associated with a vulnerability; and report the at least one probability rating for use by the static analysis tool.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
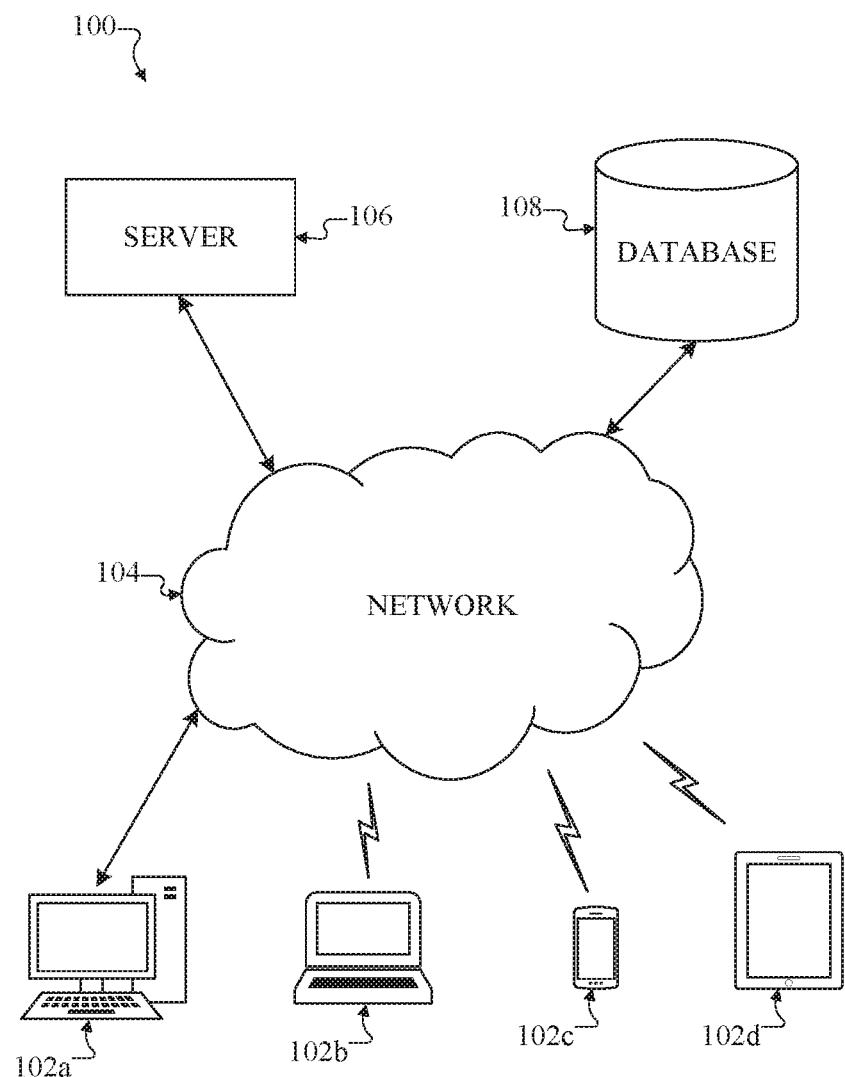
FIG. 1 illustrates an example system for prioritizing and ranking static analysis results using machine learning according to this disclosure.

FIGS. 1 through 6, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, static analysis is a method of computer program debugging that is performed by examining the code without actually executing the program. In many cases, static analysis is performed on the program's source code. In some cases, static analysis is performed on object code. Automated tools exist that can assist programmers and developers in carrying out static analysis, such as static analysis based source code and binary vulnerability detection tools. However, such tools are prone to producing many false positives, due to over-approximating the possibilities of program paths that may execute during a program execution. Here, false positives can include issues that are erroneously flagged as a vulnerability but are not actually a vulnerability in the program, and can also include actual vulnerabilities in the program that are not a concern for one or more business reasons (e.g., a vulnerability in a function that is not ever implemented or used). The prevalence of false positives results in many unnecessary alerts (in some cases, thousands or millions of alerts) that a human analyst (or downstream automation tool) must sift through in order to identify the true positives that represent actual vulnerabilities.

Previous approaches to prune false positives use heavyweight symbolic analysis approaches such as converting a program path into an satisfiability modulo theory (SMT)

formula (including a set of Boolean conditions) and querying a constraint solver to determine if there is a satisfying assignment of symbols, such that the program path is possible. Such approaches are often very slow and may not scale adequately to large programs. In addition, some of these approaches are unable to handle certain types of computations, such as those found in cryptography. Thus, a solution is needed to rank vulnerability detections by probability of each vulnerability detection being a true positive in order to make better use of human and CPU time.

This disclosure provides various machine learning techniques that can be used to apply a trained machine learning model to the problem of ranking vulnerability detections by probability of each vulnerability detection being a true positive. As described in more detail below, in some embodiments, the machine learning model can be trained to learn an approximation of determining if a feasible path exists in a program slice that results in a selected register having a specific type given a vectorized representation of a register and a vectorized representation of a program slice originating from a statically determined vulnerability detection. The trained network can then be used to rank vulnerability detection alerts by producing a probability of a vulnerability being a true positive given one or more input vectors. In some embodiments, training data can be generated using symbolic execution tools designed to discover feasible program paths.

The disclosed embodiments are applicable to most static code analysis systems, including those that analyze binary code or source code. Implementation of the disclosed embodiments can reduce false positives reported by static analysis tools to encourage adoption and give more confidence in results.

FIG. 1 illustrates an example system 100 for prioritizing and ranking static analysis results using machine learning according to this disclosure. As shown in FIG. 1, the system 100 includes multiple user devices 102a-102d, at least one network 104, at least one server 106, and at least one database 108. Note, however, that other combinations and arrangements of components may also be used here.

In this example, each user device 102a-102d is coupled to or communicates over the network 104. Communications between each user device 102a-102d and a network 104 may occur in any suitable manner, such as via a wired or wireless connection. Each user device 102a-102d represents any suitable device or system used by at least one user to provide information to the server 106 or database 108 or to receive information from the server 106 or database 108. As described in greater detail below, example types of information may include CPU register information, program slice embedding vectors, register vectors, probability ratings, vulnerabilities, and the like.

Any suitable number(s) and type(s) of user devices 102a-102d may be used in the system 100. In this particular example, the user device 102a represents a desktop computer, the user device 102b represents a laptop computer, the user device 102c represents a smartphone, and the user device 102d represents a tablet computer. However, any other or additional types of user devices may be used in the system 100. Each user device 102a-102d includes any suitable structure configured to transmit and/or receive information.

The network 104 facilitates communication between various components of the system 100. For example, the network 104 may communicate Internet Protocol (IP) packets, frame relay frames, Asynchronous Transfer Mode (ATM) cells, or other suitable information between network addresses. The network 104 may include one or more local area networks (LANs), metropolitan area networks (MANs), wide area networks (WANs), all or a portion of a global network such as the Internet, or any other communication system or systems at one or more locations. The network 104 may also operate according to any appropriate communication protocol or protocols.

The server 106 is coupled to the network 104 and is coupled to or otherwise communicates with the database 108. The server 106 supports the retrieval of information from the database 108 and the processing of that information. Of course, the database 108 may also be used within the server 106 to store information, in which case the server 106 may store the information itself.

Among other things, the server 106 processes information for prioritizing and ranking static analysis results using machine learning. The server 106 includes any suitable structure configured to process information for prioritizing and ranking static analysis results using machine learning. In some embodiments, the server 106 includes one or more processors, one or more memories, and one or more communication interfaces. Note, however, that the server 106 may be implemented in any suitable manner to perform the described functions. Also note that while described as a server here, the device(s) actually implementing the server 106 may represent one or more desktop computers, laptop computers, server computers, or other computing or data processing devices or systems.

The database 108 stores various information used, generated, or collected by the server 106 and the user devices 102a-102d. For example, the database 108 may store results from a static analysis tool or probability ratings associated with one or more vulnerabilities, as determined by a machine learning model.

There are a number of possible ways to implement the system 100 in order to provide the described functionality for prioritizing and ranking static analysis results using machine learning. For example, in some embodiments, the server 106 and database 108 are owned, operated, or managed by a common entity. In other embodiments, the server 106 and database 108 are owned, operated, or managed by different entities. Note, however, that this disclosure is not limited to any particular organizational implementation.

Although FIG. 1 illustrates one example of a system 100 for prioritizing and ranking static analysis results using machine learning, various changes may be made to FIG. 1. For example, the system 100 may include any number of user devices 102a-102d, networks 104, servers 106, and databases 108. Also, while FIG. 1 illustrates that one database 108 is coupled to the network 104, any number of databases 108 may reside at any location or locations accessible by the server 106, and each database 108 may be coupled directly or indirectly to the server 106. In addition, while FIG. 1 illustrates one example operational environment in which static analysis results can be prioritized and ranked using machine learning, this functionality may be used in any other suitable system.

Figure 2:
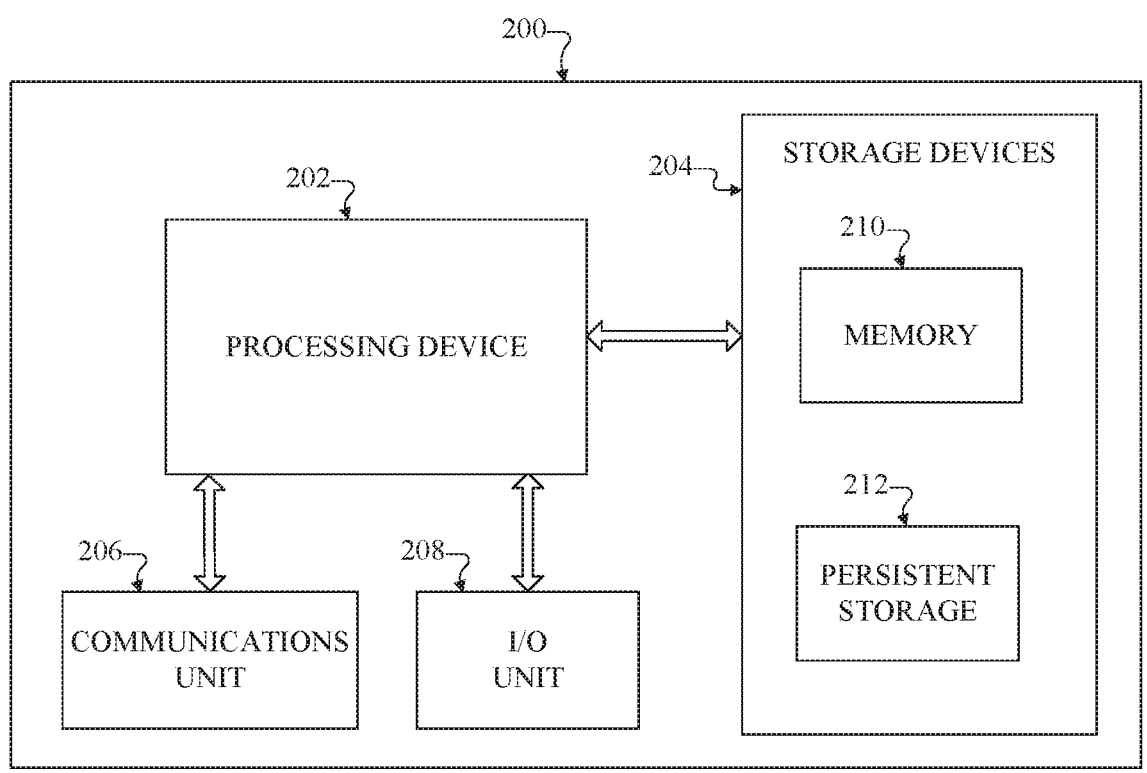
FIG. 2 illustrates an example device for prioritizing and ranking static analysis results using machine learning according to this disclosure.

FIG. 2 illustrates an example device 200 for prioritizing and ranking static analysis results using machine learning according to this disclosure. One or more instances of the device 200 may, for example, be used to at least partially implement the functionality of the server 106 of FIG. 1. However, the functionality of the server 106 may be implemented in any other suitable manner. Also, the same or similar arrangement of components may be used to at least partially implement the functionality of one or more of the user devices 102a-102d in FIG. 1. However, the functionality of each user device 102a-102d may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network, such as the network 104. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the I/O unit 208 may be omitted if the device 200 does not require local I/O, such as when the device 200 can be accessed remotely.

In some embodiments, the instructions executed by the processing device 202 can include instructions that implement the functionality of the server 106 described above. For example, the instructions executed by the processing device 202 can include instructions for prioritizing and ranking static analysis results using machine learning.

Although FIG. 2 illustrates one example of a device 200 for prioritizing and ranking static analysis results using machine learning, various changes may be made to FIG. 2. For example, computing devices and systems come in a wide variety of configurations, and FIG. 2 does not limit this disclosure to any particular computing device or system.

Figure 3:
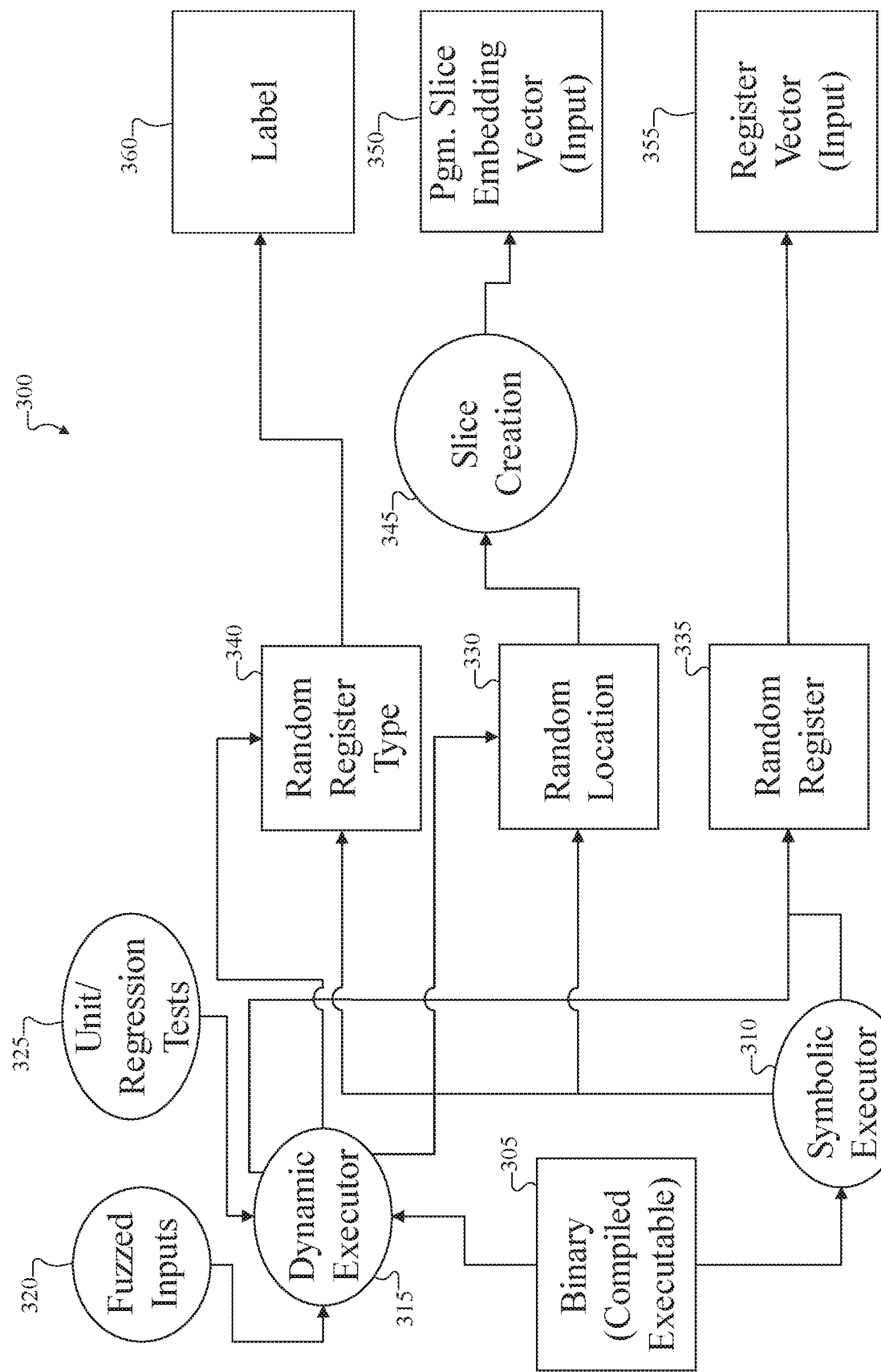
FIG. 3 illustrates an example process for generating training data for training a machine learning model that can be used for prioritizing and ranking static analysis results according to this disclosure.

FIG. 3 illustrates an example process 300 for generating training data for training a machine learning model that can be used for prioritizing and ranking static analysis results according to this disclosure. For ease of explanation, the process 300 of FIG. 3 may be described as being performed by the server 106 in FIG. 1, which may be implemented using the device 200 of FIG. 2. However, the process 300 may involve the use of any suitable device(s) in any suitable system(s).

As shown in FIG. 3, the process 300 obtains multiple computer program binaries 305. As known in the art, computer program binaries are compiled, executable programs stored in binary code form. The computer program binaries 305 are preferably diverse, representing computer programs from many different technologies or applications. For example, the computer program binaries 305 could include WINDOWS libraries, LINUX libraries, software written for different platforms (e.g., desktop or mobile device), and the like. In some embodiments, the computer program binaries 305 are obtained by compiling open source software or obtained from public software repositories. Since training of a machine learning model generally improves with more training data, the number of different computer program binaries 305 can be in the hundreds, thousands, or even more.

The computer program binaries 305 are provided as inputs to a symbolic executor 310, a dynamic executor 315, or both. That is, a first subset of the computer program binaries 305 can be provided as inputs to the symbolic executor 310 and a second subset of the computer program binaries 305 can be provided as inputs to the dynamic executor 315. Each subset can include one, some, or all of the computer program binaries 305, and there may be overlap between the first and second subsets of computer program binaries 305.

The symbolic executor 310, the dynamic executor 315, or both the symbol executor 310 and the dynamic executor 315 are executed on each binary 305 to generate training data. The symbolic executor 310 can include any suitable symbolic execution tool or algorithm, such as ANGR, MANTICORE, or S2E. Likewise, the dynamic executor 315 can include any suitable dynamic execution tool or algorithm, including fuzzers. During operation, the dynamic executor 315 can receive one or more fuzzed inputs 320 and perform one or more unit tests or regression tests 325. As known in the art, fuzzed inputs are associated with fuzzing test techniques that can be performed by the dynamic executor 315. Among the training data generated by the symbolic executor 310 and/or the dynamic executor 315 is data associated with multiple CPU registers of the server 106.

When the training data is generated using the symbolic executor 310, the dynamic executor 315, or both, the server 106 selects random locations 330 in the code of each binary 305, and generates a program slice 345 from each random location 330. The program slice 345 represents all of the portions of the binary 305 (including control flow dependencies and data flow dependencies) that correspond to a particular vulnerability. The server 106 also randomly selects a register 335 among the CPU registers of the server 106. The randomly selected register 335 is associated with a register type 340. The register type 340 indicates the type of data stored in the register 335 during the program slice 345. There are multiple possible register types. For example, the register type 340 may indicate that data stored in the register 335 comes from network data, which might be untrusted. As other examples, the register 335 may be allocated on the heap, the register 335 may point to a location on stack memory, the register 335 may point to freed memory, or the register 335 may be trusted. In general, the register type 340 is related to one or more types of vulnerabilities that may be detected by static analysis. Other register types are possible and are within the scope of this disclosure. All registers should have a register type. In some embodiments, if the selected register 335 does not have a specific register type 340, then the register 335 can be assigned an "empty" register type 340.

After the program slice 345 is generated, the server 106 creates a program slice embedding vector 350 from the program slice 345. Here, embedding refers to a process of converting the program slice 345 into an input that is fed to the machine learning model. The machine learning model takes vectors of numbers as input. Thus, the program slice embedding vector 350 is generated as a vector for inputting the program slice 345 into a machine learning model. The server 106 can use any suitable embedding algorithm(s) to generate the program slice embedding vector 350. For example, the server 106 can use a neural network algorithm, the STRUCTURE2VEC algorithm, another graph embedding algorithm, or the like.

In addition to creating the program slice embedding vector, the server 106 generates a register vector 355 based on the selected register 335. The register vector 355 is initialized based on the selection of the register 335 from among the possible CPU registers, and serves as an identifier of the selected register 335 to the machine learning model. In some embodiments, the register vector 355 is a vector of elements, where each element represents one of the possible CPU registers from which the register 335 is selected. Because the number of registers for a particular CPU architecture is generally static, the register vector 355 can have a corresponding static number of elements. The element of the register vector 355 corresponding to the selected register 335 is initialized with a value (e.g., '1') to indicate that the register 335 has been selected, and the other elements of the register vector 355 are initialized with a different value (e.g., '0') to indicate that those registers have not been selected. For example, if the server 106 includes thirty-two registers, and the selected register 335 is the fifth register of the thirty-two registers, then the register vector 355 can be a thirty-two element vector where the fifth element is set to '1' and the other elements are set to '0'. Of course, this is merely one example; other vector configurations are possible and within the scope of this disclosure. For example, in some embodiments, the register vector 355 could be a single-element vector that has a value (e.g., '5') indicating the selected register 335.

Corresponding to the program slice embedding vector 350 and the register vector 355 is a label 360 for the training data. As known in the art, training data can be labeled for training a machine learning model. The label 360 is derived from the register type 340 of the selected register 335. These elements (the program slice embedding vector 350, the register vector 355, and the label 360) together comprise a group of training data that is generated for training the machine learning model. The server 106 can generate additional program slice embedding vectors 350, register vectors 355, and labels 360 from the other binaries 305 and group them as training data for training the machine learning model.

Although FIG. 3 illustrates one example of a process 300 for generating training data for training a machine learning model, various changes may be made to FIG. 3. For example, various operations in FIG. 3 may overlap, occur in parallel, occur in a different order, or occur any number of times.

Figure 4:
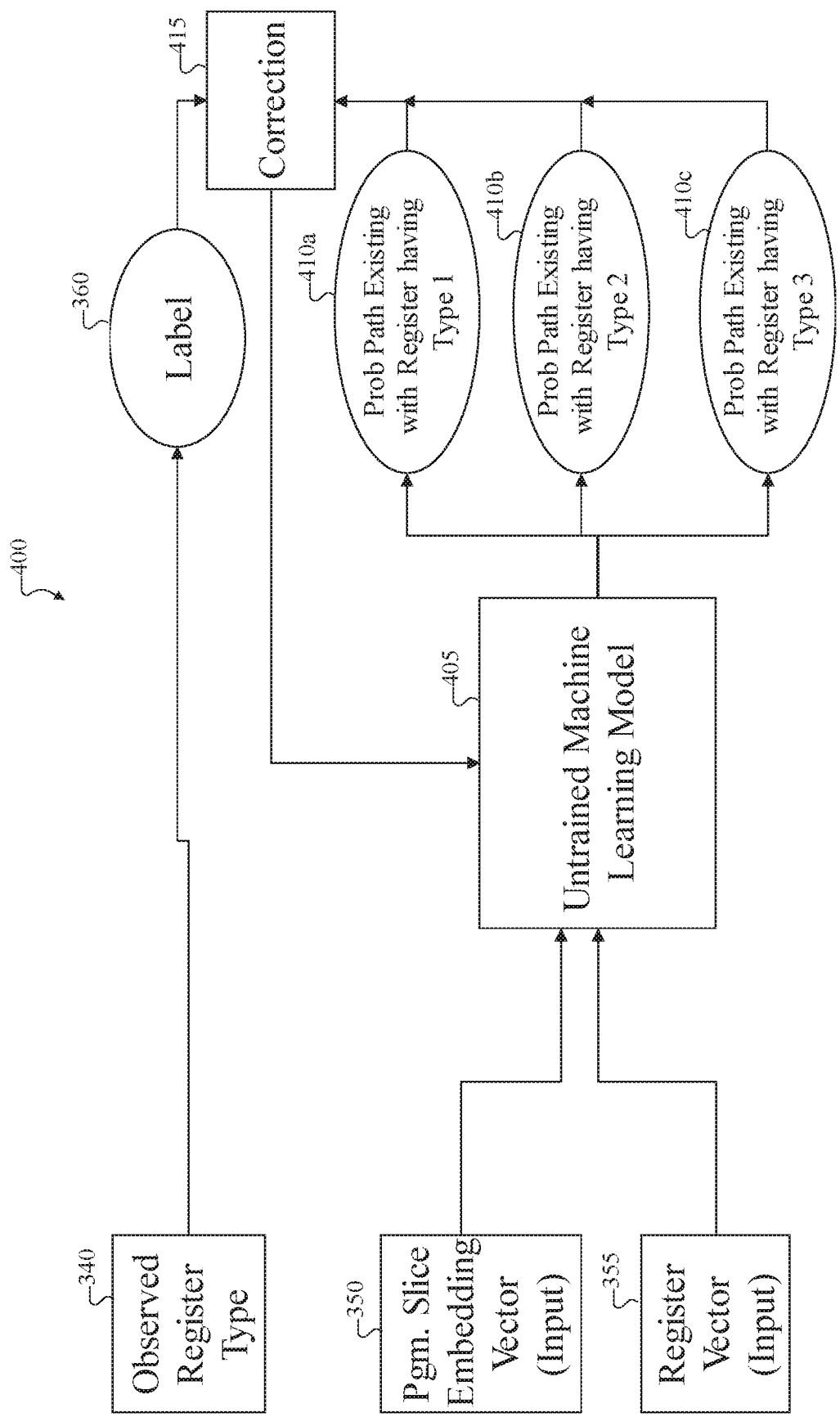
FIG. 4 illustrates an example process for training a machine learning model that can be used for prioritizing and ranking static analysis results according to this disclosure.

FIG. 4 illustrates an example process 400 for training a machine learning model that can be used for prioritizing and ranking static analysis results according to this disclosure. For example, using the process 400, a machine learning model can be trained to learn the probability of a feasible path existing in an arbitrary program slice that results in the selected register (identified by the register vector 355) having a specified type. For ease of explanation, the process 400 of FIG. 4 may be described as being performed by the server 106 in FIG. 1, which may be implemented using the device 200 of FIG. 2. However, the process 400 may involve the use of any suitable device(s) in any suitable system(s).

As shown in FIG. 4, during the process 400, the server 106 obtains groups of training data, where each group includes a program slice embedding vector 350 and a register vector 355. The program slice embedding vector 350 and the register vector 355 for each group can be generated using the process 300 of FIG. 3. Of course, this is merely one example; each program slice embedding vector 350 and register vector 355 can be prepared using any suitable training data generation technique. As described with respect to FIG. 3, the register vector 355 identifies a selected CPU register that has a register type 340.

Once the program slice embedding vector 350 and the register vector 355 are obtained, the server 106 provides the program slice embedding vector 350 and the register vector 355 as inputs to train a machine learning model 405. The server 106 trains the machine learning model 405 by operating in an iterative manner, with feedback generated after each iteration.

During each iteration of the training process 400, the machine learning model 405 generate one or more probability ratings 410a-410c. Here, each probability rating 410a-410c is associated with a particular register type and indicates a probability that a feasible path exists that results in the selected register (identified by the register vector 355) having the specified type. Each probability rating 410a-410c is associated with a different register type. For example, the probability rating 410a can be associated with an untrusted type, the probability rating 410b can be associated with an allocated memory type, and the probability rating 410c can be associated with a freed memory type. Each probability rating 410a-410c indicates a probability of a path existing in the program slice that results in its associated type. For example, the probability rating 410a can indicate that the probability of a path existing in the program slice that results in the register identified by the register vector 355 being untrusted is, e.g., 70%.

Ideally, during multiple iterations through the training process 400, the machine learning model 405 generally improves the generation of the probability ratings 410a-410c. For each iteration, the server 106 can apply a correction 415 to train the machine learning model 405. For example, if the machine learning model 405 concludes that the probability rating 410a is 70%, but the true value is 100%, then a correction 415 addressing the discrepancy can be input to the machine learning model 405. The correction 415 is applied in one or more additional iterations of training.

Although FIG. 4 illustrates one example of a process 400 for training a machine learning model that can be used for prioritizing and ranking static analysis results, various changes may be made to FIG. 4. For example, various operations in FIG. 4 may overlap, occur in parallel, occur in a different order, or occur any number of times. Also, while the process 400 is shown with three probability ratings 410a-410c, this is merely one example. In other embodiments, the number of probability ratings generated by the machine learning model 405 can be one, two, or more than three.

Figure 5:
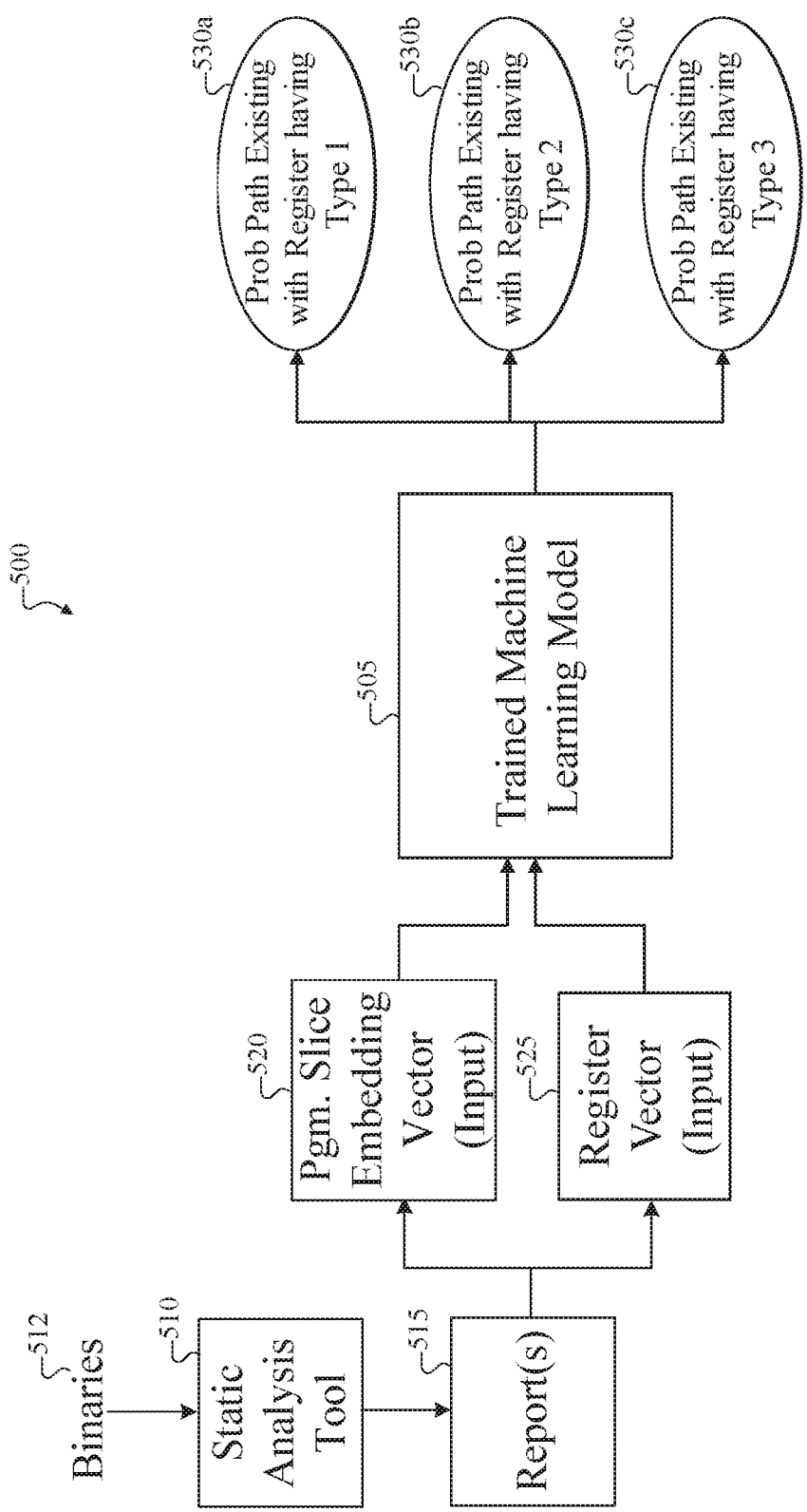
FIG. 5 illustrates an example process for prioritizing and ranking static analysis results using machine learning according to this disclosure.

FIG. 5 illustrates an example process 500 for prioritizing and ranking static analysis results using machine learning according to this disclosure. For ease of explanation, the process 500 of FIG. 5 may be described as being performed by the server 106 in FIG. 1, which may be implemented using the device 200 of FIG. 2. However, the process 500 may involve the use of any suitable device(s) in any suitable system(s).

As shown in FIG. 5, the process 500 uses a trained machine learning model 505. The machine learning model 505 operates to take the output of a static source code-based or binary code-based vulnerability detection system and rank the results by probability of each vulnerability being a true positive. The ranking can be used to prioritize a vulnerability detection that has a high likelihood of actually occurring during an execution. The machine learning model 505 can be, for example, a neural network, a support vector machine (SVM), or another suitable machine learning model that has been previously trained to learn the probability of a path existing in a program slice that results in a selected register having a specific type given a labeled data set of vectorized registers and vectorized program slices. As a particular example, the trained machine learning model 505 may have been trained using the training process 400 of FIG. 4 and training data generated in accordance with the process 300 of FIG. 3.

Inputs to the machine learning model 505 are obtained based on results of a static analysis tool 510. Upon execution, the static analysis tool 510 performs a vulnerability analysis on one or more binaries 512 and identifies numerous suggested vulnerabilities, as known in the art. The vulnerabilities can be organized and reported in at least one report 515. As a first example ("Example 1"), the report 515 can suggest a "write-what-where" vulnerability where a pointer contained in a CPU register has an untrusted type and a value written in another CPU register has an untrusted type. As known in the art, a "write-what-where" vulnerability occurs where a user has influence over a location that data is written to, as well as the value of the data. As another example ("Example 2"), the report 515 can suggest a "double free" vulnerability where a pointer contained in the CPU register points to freed memory and is passed to a function that frees the memory again. Each report 515 can include any suitable reporting structure, including, but not limited to, an electronic data file, a database, a printed report, or a combination of these.

The information in the report 515 is converted to inputs for the machine learning model 505, which include one or more program slice embedding vectors 520 and register vectors 525. Each program slice embedding vector 520 is generated based on a program slice of one of the binaries 512 and is associated with a location of the possible vulnerability as identified in the report 515. Each register vector 525 corresponds to the CPU register that is the subject of the identified vulnerability. Each program slice embedding vector 520 and register vector 525 can be generated using operations that are the same as or similar to operations of the process 300 described in FIG. 3. Of course, this is merely one example; each program slice embedding vector 520 and register vector 525 can be generated using any suitable data generation technique.

Continuing Example 1 above, a program slice embedding vector 520 and register vector 525 may be generated based on the pointer register that may have an untrusted type. Another program slice embedding vector 520 and register vector 525 may be generated based on the "value written" register that may have an untrusted type. Continuing Example 2 above, a program slice embedding vector 520 and register vector 525 may be generated based on the "double free" pointer that points to freed memory. In some embodiments, each program slice embedding vector 520 and register vector 525 are generated by the server 106, which executes the machine learning model 505. In other embodiments, each program slice embedding vector 520 and register vector 525 are generated by another computing device and are provided to the server 106 as inputs for the machine learning model 505.

After each program slice embedding vector 520 and register vector 525 are generated, the server 106 obtains the program slice embedding vector 520 and register vector 525 as inputs and executes the machine learning model 505. In some embodiments, the machine learning model 505 may be executed multiple times, once for each distinct pair of program slice embedding vector 520 and register vector 525. For example, based on Example 1, the machine learning model 505 may be executed twice—once for the pointer register and once for the "value written" register. Upon each execution, the machine learning model 505 generates one or more probability ratings 530a-530c. For example, in one execution based on Example 1, the probability rating 530a could be a probability (e.g., 70%) that a real execution path exists with the pointer register having an untrusted data type. In the other execution based on Example 1, the probability rating 530b could be a probability that a real execution path exists with the "value written" register having an untrusted data type. Based on Example 2, the probability rating 530c could be a probability that a real execution path exists with a "double free" pointer register that points to freed memory. While three probability ratings 530a-530c are shown in FIG. 5, there is merely one example. In other executions, there may be one, two, or more than three probability ratings 530a-530c generated.

When multiple probability ratings 530a-530c are generated by the machine learning model 505, the probability ratings 530a-530c can be ranked by probability or aggregated in some manner. For example, multiple probability ratings 530a-530c could be aggregated by averaging the values. Once the probability ratings 530a-530c are ranked or aggregated, the probability ratings 530a-530c can be reported for prioritization in the static analysis tool 510.

Although FIG. 5 illustrates one example of a process 500 for prioritizing and ranking static analysis results using machine learning, various changes may be made to FIG. 5. For example, various operations in FIG. 5 may overlap, occur in parallel, occur in a different order, or occur any number of times.

Figure 6:
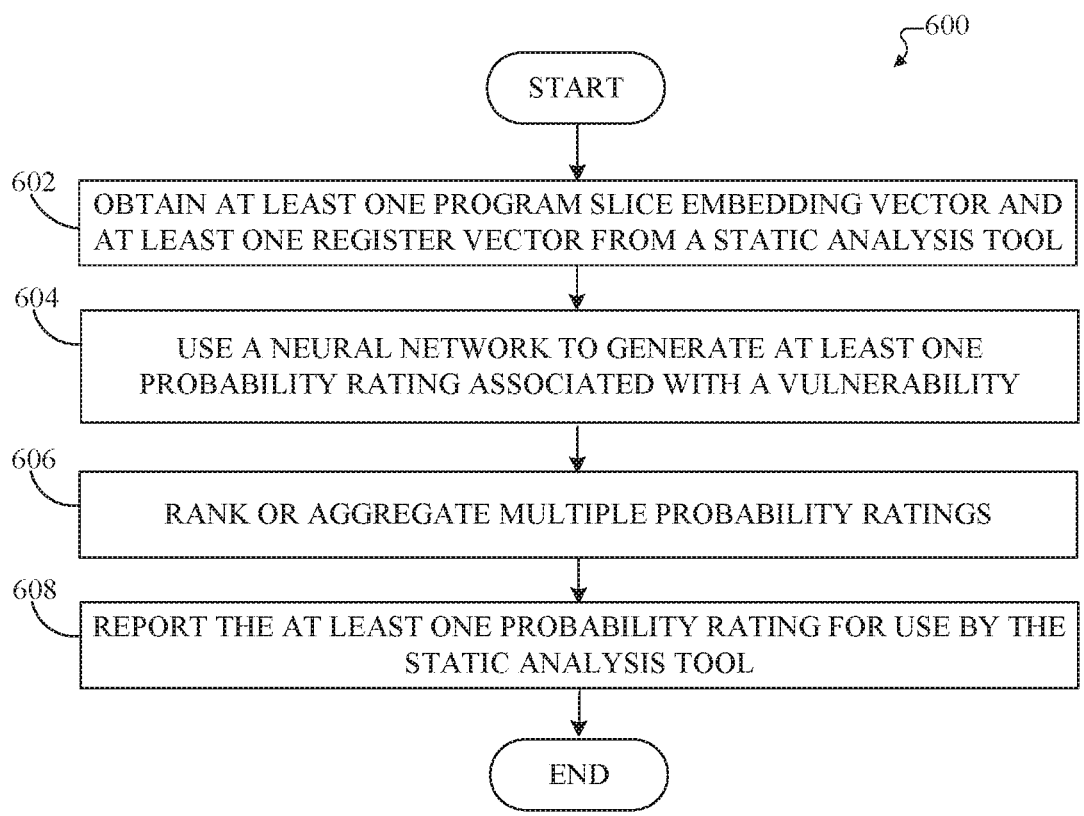
FIG. 6 illustrates an example method for prioritizing and ranking static analysis results using machine learning according to this disclosure.

FIG. 6 illustrates an example method 600 for prioritizing and ranking static analysis results using machine learning according to this disclosure. For ease of explanation, the method 600 of FIG. 6 may be described as being performed using the process 500 in FIG. 5, which may be implemented using one or more devices 200 of FIG. 2. However, the method 600 may involve the use of any suitable device(s) in any suitable system(s).

As shown in FIG. 6, at step 602, at least one program slice embedding vector and at least one register vector are obtained. The at least one program slice embedding vector and register vector are generated based on results from a static analysis tool, and each register vector corresponds to one program slice embedding vector. This may include, for example, a computing device (e.g., the device 200) obtaining at least one program slice embedding vector 520 and at least one register vector 525 that are generated based on results from the static analysis tool 510. In some embodiments, the results from the static analysis tool 510 are generated based on analysis of a binary 512 by the static analysis tool 510. In some embodiments, each program slice embedding vector 520 is generated from a program slice representing portions of the binary 512 that correspond to the vulnerability, the same as (or similar to) the manner by which the program slice embedding vector 350 is generated from a slice 345 in FIG. 3. In some embodiments, each register vector 525 indicates a CPU register that corresponds to the vulnerability, the same as (or similar to) the manner in which the register vector 355 indicates a register 335 in FIG. 3.

At step 604, a machine learning model is used to generate, from the at least one program slice embedding vector and the at least one register vector, at least one probability rating associated with a vulnerability. This may include, for example, the computing device using the machine learning model 505 to generate at least one probability rating 530a-530c. In some embodiments, the at least one probability rating 530a-530c indicates a probability of the vulnerability in the binary 512. In some embodiments, the machine learning model 505 is trained in an iterative process using training data comprising a plurality of program slice embedding vectors, a plurality of register vectors, and a plurality of labels, such as described with respect to FIG. 4. In some embodiments, each of the register vectors in the training data indicates a CPU register and each of the labels in the training data identifies a register type of a corresponding register vector, such as described with respect to training data in FIG. 3.

At step 606, when there are multiple probability ratings, the multiple probability ratings are ranked or aggregated. This may include, for example, the computing device ranking or aggregating multiple probability ratings 530a-530c.

At step 608, the at least one probability rating is reported for use by the static analysis tool. This may include, for example, the computing device reporting the at least one probability rating 530a-530c for use by the static analysis tool 510.

Although FIG. 6 illustrates one example of a method 600 for prioritizing and ranking static analysis results using machine learning, various changes may be made to FIG. 6. For example, while shown as a series of steps, various steps in FIG. 6 may overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
obtaining at least one program slice embedding vector and at least one register vector that are generated based on results from a static analysis tool, the at least one register vector corresponding to the at least one program slice embedding vector;
using a machine learning model to generate, from the at least one program slice embedding vector and the at least one register vector, at least one probability rating associated with a vulnerability; and
reporting the at least one probability rating for use by the static analysis tool.

2. The method of claim 1, wherein:
the results from the static analysis tool are generated based on analysis of a binary by the static analysis tool; and
the at least one probability rating indicates a probability of the vulnerability existing in the binary.

3. The method of claim 2, wherein each of the at least one program slice embedding vector is generated from a program slice representing portions of the binary that correspond to the vulnerability.

4. The method of claim 2, wherein each of the at least one register vector indicates a CPU register that corresponds to the vulnerability.

5. The method of claim 1, wherein:
the at least one probability rating comprises multiple probability ratings, and the method further comprises ranking or aggregating the multiple probability ratings.

6. The method of claim 1, wherein the machine learning model is trained in an iterative process using training data comprising a plurality of program slice embedding vectors, a plurality of register vectors, and a plurality of labels.

7. The method of claim 6, wherein:
each of the plurality of register vectors in the training data indicates a CPU register; and
each of the plurality of labels in the training data identifies a register type of a corresponding one of the plurality of register vectors.

8. A system comprising:
at least one memory configured to store instructions; and
at least one processor coupled to the at least one memory and configured when executing the instructions to:
obtain at least one program slice embedding vector and at least one register vector that are generated based on results from a static analysis tool, the at least one register vector corresponding to the at least one program slice embedding vector;
use a machine learning model to generate, from the at least one program slice embedding vector and the at least one register vector, at least one probability rating associated with a vulnerability; and
report the at least one probability rating for use by the static analysis tool.

9. The system of claim 8, wherein:
the results from the static analysis tool are generated based on analysis of a binary by the static analysis tool; and
the at least one probability rating indicates a probability of the vulnerability existing in the binary.

10. The system of claim 9, wherein each of the at least one program slice embedding vector is generated from a program slice representing portions of the binary that correspond to the vulnerability.

11. The system of claim 9, wherein each of the at least one register vector indicates a CPU register that corresponds to the vulnerability.

12. The system of claim 8, wherein:
the at least one probability rating comprises multiple probability ratings, and
the at least one processor is further configured to rank or aggregate the multiple probability ratings.

13. The system of claim 8, wherein the machine learning model is trained in an iterative process using training data comprising a plurality of program slice embedding vectors, a plurality of register vectors, and a plurality of labels.

14. The system of claim 13, wherein:
each of the plurality of register vectors in the training data indicates a CPU register; and
each of the plurality of labels in the training data identifies a register type of a corresponding one of the plurality of register vectors.

15. A non-transitory computer readable medium containing instructions that when executed cause at least one processor to:
obtain at least one program slice embedding vector and at least one register vector that are generated based on results from a static analysis tool, the at least one register vector corresponding to the at least one program slice embedding vector;
use a machine learning model to generate, from the at least one program slice embedding vector and the at least one register vector, at least one probability rating associated with a vulnerability; and
report the at least one probability rating for use by the static analysis tool.

16. The non-transitory computer readable medium of claim 15, wherein:
the results from the static analysis tool are generated based on analysis of a binary by the static analysis tool; and
the at least one probability rating indicates a probability of the vulnerability existing in the binary.

17. The non-transitory computer readable medium of claim 16, wherein each of the at least one program slice embedding vector is generated from a program slice representing portions of the binary that correspond to the vulnerability.

18. The non-transitory computer readable medium of claim 16, wherein each of the at least one register vector indicates a CPU register that corresponds to the vulnerability.

19. The non-transitory computer readable medium of claim 15, wherein:
the at least one probability rating comprises multiple probability ratings, and
the instructions further cause the at least one processor to rank or aggregate the multiple probability ratings.

20. The non-transitory computer readable medium of claim 15, wherein the machine learning model is trained in an iterative process using training data comprising a plurality of program slice embedding vectors, a plurality of register vectors, and a plurality of labels.

* * * * *